US012793697B2

(12) United States Patent
Dantrey et al.

(10) Patent No.: US 12,793,697 B2
(45) Date of Patent: Nov. 10, 2026

(54) GENERATING SYNTHETIC VOICES

(71) Applicant: NVIDIA Corporation, Santa Clara, CA (US)

(72) Inventors: Ambrish Dantrey, Pune (IN); Sudheer Kumar Kovela, Pimpri-Chinchwad (IN)

(73) Assignee: NVIDIA Corporation, Santa Clara, CA (US)

( * ) Notice: Subject to any disclaimer, the term of this patent is extended or adjusted under 35 U.S.C. 154(b) by 234 days.

(21) Appl. No.: 18/631,614

(22) Filed: Apr. 10, 2024

(65) Prior Publication Data

US 2025/0322822 A1 Oct. 16, 2025

(51) Int. Cl.
*G10L 13/033* (2013.01)

(52) U.S. Cl.
CPC ................................ *G10L 13/0335* (2013.01)

(58) Field of Classification Search
None
See application file for complete search history.

(56) References Cited

U.S. PATENT DOCUMENTS

2019/0251952 A1* 8/2019 Arik ........................ G10L 13/08
2020/0380952 A1* 12/2020 Zhang ..................... G10L 13/02
2021/0217404 A1* 7/2021 Jia .......................... G10L 13/04

* cited by examiner

*Primary Examiner* — Nafiz E Hoque
(74) *Attorney, Agent, or Firm* — IRON SUMMIT IP LLP

(57) ABSTRACT

In various examples, generating synthetic voices for speech for conversational systems and applications is described herein. Systems and methods described herein may generate data, such as data representing speaker embeddings (e.g., timbre, etc.) and/or frequency values (e.g., pitch, etc.), which is then used to generate audio data representing speech in synthetically produced voices. For instance, speaker embeddings may be used to generate a new speaker embedding associated with a synthetically produced voice, such as by linearly interpolating between the speaker embeddings and/or sampling an embedding space associated with speaker embeddings. Additionally, a frequency value associated with the synthetically produced voice may be identified, such as by randomly sampling from a distribution of frequency values. A component may then use the speaker embedding, the frequency value, and/or input data representing linguistic content to generate audio data representing the speech in the synthetically produced voice.

20 Claims, 12 Drawing Sheets

GENERATING SYNTHETIC VOICES

BACKGROUND

Many applications, such as gaming applications, interactive applications, communications applications, multimedia applications, and/or the like, use speech to communicate with users. In order for these applications to provide speech, the applications use machine learning models that are trained to perform one or more tasks, such as text-to-speech processing, speech recognition processing, speech synthesis processing, speaker recognition processing, and/or the like. As such, these machine learning models may require large scale multi-speaker datasets for training, such that the machine learning models are then able to generalize for speakers for which the machine learning models were not trained. However, generating large scale multi-speaker datasets may require a large number of human resources (e.g., human speakers) and/or computing resources. Additionally, and for similar reasons, generating large scale multi-speaker datasets may take a long time to accomplish.

SUMMARY

Embodiments of the present disclosure relate to generating synthetic voices for speech for conversational systems and applications. Systems and methods described herein may generate data, such as data representing speaker embeddings (e.g., timbre, etc.) and/or frequency values (e.g., pitch, etc.), where the data is then used to generate audio data representing speech in synthetically produced voices. For instance, speaker embeddings may be used to generate a new speaker embedding associated with a synthetically produced voice, such as by linearly interpolating between the speaker embeddings and/or sampling an embedding space associated with speaker embeddings. Additionally, a frequency value associated with the synthetically produced voice may be identified, such as by randomly sampling from a distribution of frequency values. A component, such as one or more machine learning models, may then use the speaker embedding, the frequency value, and/or input data representing linguistic content to generate audio data representing the speech in the synthetically produced voice. These processes may then be repeated to generate any number of speech samples using different voices.

In contrast to conventional systems, such as those described above, the current systems, in some embodiments, may be used to generate synthetically produced voices that may then be used to perform various tasks, such as for generating large scale multi-speaker datasets for training machine learning models. As such, the current systems may require less resources, such as human resources and/or computing resources, and/or less time to generate a large-scale multi-speaker dataset as compared to the conventional systems. For instance, and as described in more detail herein, these improvements are because the current systems may use speech samples from a few human speakers to then generate additional speech samples that are associated with synthetically produced voices. Additionally, even though only a few human speech samples are used, by performing the processes described herein, the current systems can be used to generate a range of synthetically produced voices, such as voices with varying timbre characteristics and/or pitch levels.

BRIEF DESCRIPTION OF THE DRAWINGS

The present systems and methods for generating synthetic voices for speech for conversational systems and applications are described in detail below with reference to the attached drawing figures, wherein.

DETAILED DESCRIPTION

Figure 1:
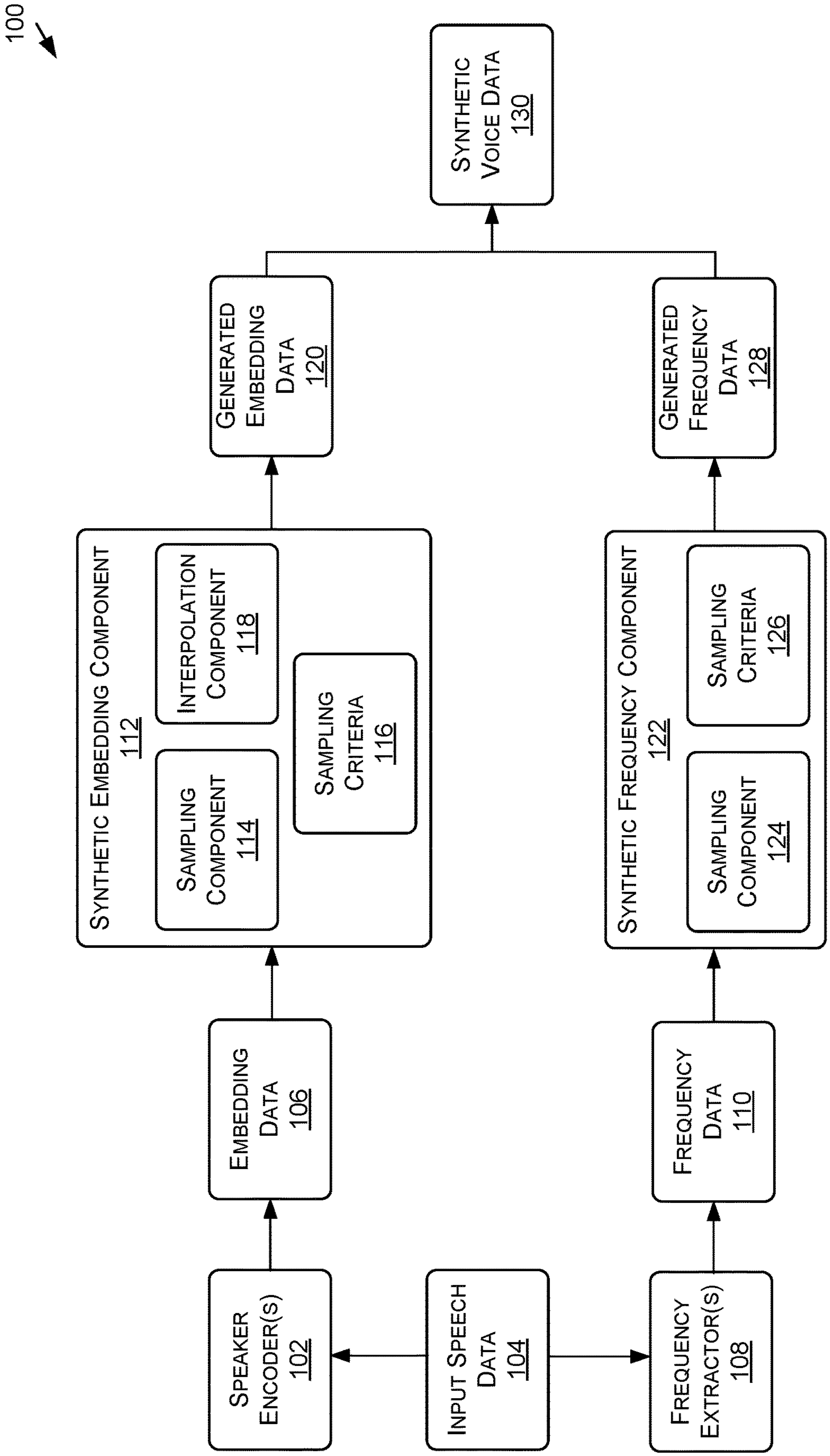
FIG. 1 illustrates an example of a process for generating synthetic voices for use to perform various tasks, in accordance with some embodiments of the present disclosure.

Systems and methods are disclosed related to generating synthetic voices for speech for conversational systems and applications. For instance, a system(s) may receive, obtain, and/or generate first data representing one or more first audio features corresponding to one or more first voices. As described herein, the first data may include, but is not limited to, speaker embeddings, data representing frequency values, data representing intensity values, data representing accents, data representing speech rates, data representing speech tones, and/or data representing any other characteristic associated with voices. In some examples, the system(s) may generate the first data by processing audio data representing speech from one or more speakers. For example, the system(s) may process the audio data using at least one or more speaker encoders that are configured to generate speaker embeddings and/or one or more frequency extractors that are configured to determine frequency values (e.g., a pitch, etc.) associated with the first voice(s) of the speaker(s).

The system(s) may then use the first data to generate second data representing one or more second audio features associated with one or more second voices, where the second voice(s) may correspond to one or more synthetically produced voices. For instance, and for a second voice, the system(s) may generate a speaker embedding associated with the second voice using one or more techniques. For a first example, the system(s) may generate an embedding space using the first data (e.g., the speaker embeddings), where the embedding space may model the speaker embeddings as a distribution (e.g., a multinomial gaussian distribution). The system(s) may then generate the speaker embedding by sampling a point within the distribution. As described in more detail herein, when performing the sampling, the system(s) may use a mean value and/or a standard deviation value. Additionally, in some examples, the system (s) may use a mean value and/or a standard deviation value that is associated with a type of voice for which the system(s) is trying to synthetically produce. For a second example, the system(s) may generate the speaker embedding by interpolating between two of the speaker embeddings. As described in more detail herein, when performing the interpolation, the system(s) may use weights associated with the speaker embeddings.

In addition to, or alternatively from, generating the speaker embedding, the system(s) may generate a frequency value associated with a pitch of the second voice. For example, the system(s) may use a distribution (e.g., a normal distribution) of frequency values, where the normal distribution may be generated using the frequency values from the first data and/or may be obtained by the system(s). The system(s) may then determine the frequency value using the distribution of frequency values, such as by randomly sampling the distribution of frequency values. As described in more detail herein, when performing the sampling, the system(s) may use a mean value and/or a standard deviation value. Additionally, in some examples, the system(s) may use a mean value and/or a standard deviation value that is associated with a type of voice for which the system(s) is trying to synthetically produce.

The system(s) may then use the second data representing the second voice (e.g., the speaker embedding, the frequency value, etc.) to perform one or more tasks. For instance, the system(s) may receive input data representing linguistic content, such as words and syllables or other phonemes, or other parts of speech which carry meaning. In some examples, the input data may include audio data representing speech corresponding to the linguistic content. In some examples, the input data may include text data representing text associated with the linguistic content. In either of the examples, the system(s) may process the second data representing the second voice along with the input data in order to generate audio data representing speech, where the speech corresponds to the linguistic content and is in the second voice. In other words, by performing the processes described herein, the system(s) is able to generate speech in a synthetically produced voice.

In some examples, the system(s) may continue to perform these processes in order to generate audio data representing additional speech samples in additional synthetically produced voices. In some examples, the system(s) may then perform one or more tasks using the generated audio data. For example, the system(s) may generate a multi-speaker dataset that the system(s) (and/or another system(s)) may then use to train one or more machine learning models. In such an example, the system(s) may perform one or more verification processes associated with the multi-speaker dataset, such as by verifying that the multi-speaker dataset includes speech samples corresponding to an adequate representation of different voices. For example, the system(s) may use one or more speaker encoders to process the audio data and, based at least on the processing, generate speaker embeddings associated with the speech samples. The system (s) may then determine, using the speaker embeddings, that there are a threshold number of different speakers (e.g., a threshold number of different voices) associated with the speech samples.

The systems and methods described herein may be used by, without limitation, non-autonomous vehicles or machines, semi-autonomous vehicles or machines (e.g., in one or more adaptive driver assistance systems (ADAS)), autonomous vehicles or machines, piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. Further, the systems and methods described herein may be used for a variety of purposes, by way of example and without limitation, for machine control, machine locomotion, machine driving, synthetic data generation, model training, perception, augmented reality, virtual reality, mixed reality, robotics, security and surveillance, simulation and digital twinning, autonomous or semi-autonomous machine applications, deep learning, environment simulation, object or actor simulation and/or digital twinning, data center processing, conversational AI, light transport simulation (e.g., ray-tracing, path tracing, etc.), collaborative content creation for 3D assets, cloud computing and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems for performing digital twin operations, systems implemented using an edge device, systems implementing large language models (LLMs), systems incorporating one or more virtual machines (VMs), systems for performing synthetic data generation operations, systems implemented at least partially in a data center, systems for performing conversational AI operations, systems for performing light transport simulation, systems for performing collaborative content creation for 3D assets, systems for performing generative AI operations, systems implemented at least partially using cloud computing resources, and/or other types of systems.

With reference to FIG. 1, FIG. 1 illustrates an example of a process 100 for generating synthetic voices for use to perform various tasks, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

The process 100 may include one or more speaker encoders 102 processing input speech data 104. As described herein, the input speech data 104 may represent one or more instances of speech from one or more speakers, where an individual instance of speech from a speaker may be associated with a unique voice of the speaker. For example, the voice may include one or more unique audio features (e.g., one or more unique speech features), such as a timbre, a frequency (e.g., a pitch), an intensity, a phonation, a prosody, a tone, and/or any other voice characteristic. In some examples, the instance(s) of speech may correspond to linguistic content, such as words and syllables or other phonemes, or other parts of speech which carry meaning. For example, a first instance of speech (e.g., a first speech sample) represented by the input speech data 104 may correspond to first linguistic content in a first voice, a second instance of speech (e.g., a second speech sample) represented by the input speech data 104 may correspond to second linguistic content in a second voice, a third instance of speech (e.g., a third speech sample) represented by the input speech data 104 may correspond to third linguistic content in a third voice, and/or so forth.

In some examples, the input speech data 104 may represent additional information associated with the speakers that is later used to produce synthetic voices. For instance, the input speech data 104 may represent various speaker types associated with the speakers, such as a first type of speaker with a light (less resonant) voice, a second type of speaker with a deep (more resonant) voice, a third type of speaker with a low pitch voice, a fourth type of speaker with a high pitch voice, a fifth type of speaker that is associated with a child, a sixth type of speaker that is associated with an adult, a seventh type of speaker that is associated with an older adult, and/or any other type of speaker for which voice characteristics may vary. While these are just a few examples of types of speakers that may be associated with speech, in other examples, additional and/or alternative types of speakers may be associated with speech.

The speaker encoder(s) 102 may process the input speech data 104 and, based at least on the processing, generate embedding data 106 associated with the speech. In some examples, the embedding data 106 may represent speaker embeddings associated with the speech as represented by the input speech data 104. For example, the embedding data 106 may represent a first speaker embedding associated with a first speaker, a second speaker embedding associated with a second speaker, a third speaker embedding associated with a third speaker, and/or so forth. As such, the embedding data 106 may represent speaker embeddings associated with various voices.

Additionally, or alternatively, in some examples, the embedding data 106 may represent an embedding space (e.g., a latent space) associated with the speaker embeddings. For example, the speaker encoder(s) 102 may output speaker embeddings of reference speech. In some examples, the speaker encoder(s) 102 may include a layered network (e.g., a five-layered residual network, etc.) that takes a Mel-spectrogram as input and outputs the speaker embeddings, as well as a mean and variance vector. In some examples, the speaker encoder(s) 102 may then generate a distribution (e.g., a Gaussian distribution, etc.) of speaker embeddings using a predicted mean vector and variance vector. In some examples, a loss (e.g., a Kullback-Liebler divergence loss, etc.) between speaker embeddings and one or more functions (e.g., one or more standard Gaussian prior functions) as a regularizer to promote a continuous embedding space with independent factors, where the continuous embedding space is represented by the embedding data 106.

In some examples, the embeddings represented by the embedding data 106 may be labeled, such as with the information associated with the speakers. For a first example, if a speaker embedding is generated using speech associated with a speaker that includes a deep voice, then the speaker embedding may further be associated with data (e.g., embedding data 106) indicating the second type of user (e.g., a speaker with a deep voice). For a second example, if a speaker embedding is generated using speech associated with a speaker that includes an adult, then the speaker embedding may further be associated with data (e.g., embedding data 106) indicating the sixth type of speaker (e.g., an adult speaker).

The process 100 may also include one or more frequency extractors 108 processing the input speech data 104 and, based at least on the processing, generating frequency data 110 associated with the speech. For instance, the frequency extractor(s) 108 may be configured to extract the fundamental frequencies, which may represent the pitch and/or prosody associated with the speech, where the fundamental frequencies and/or a distribution associated with the fundamental frequencies are represented by the frequency data 110. However, in other examples, the process 100 may not include the frequency extractor(s) 108. In such examples, the frequency data 110 may just represent a distribution of frequencies associated with voices.

Additionally, in some examples, the frequency values represented by the frequency data 110 may be labeled, such as with information associated with the speakers. For a first example, if a frequency value is generated using speech associated with a speaker that includes a deep voice, then the frequency value may further be associated with data (e.g., frequency data 110) indicating the second type of user (e.g., a deep voice speaker). For a second example, if a frequency value is within a range that is associated with a normal adult, then the frequency value may further be associated with data (e.g., embedding data 106) indicating the sixth type of speaker (e.g., an adult speaker). In other words, the frequency data 110 may represent both the distribution of frequency values associated with voices along with one or more frequency value ranges associated with different types of speaker voices.

As described herein, the process 100 may be used to produce synthetic voices. For instance, the process 100 may include using a synthetic embedding component 112 that is configured to generate random speaker embeddings associated with the synthetic voices. As described herein, the synthetic embedding component 112 may use one or more techniques to generate the random speaker embeddings. For instance, the synthetic embedding component 112 may use a sampling component 114 that is configured to randomly sample the embedding space, which is again represented by the embedding data 106, in order to identify points within the embedding space. The sampling component 114 may then generate speaker embeddings using the points. In some examples, the sampling component 114 may use one or more criteria for performing the random sampling, where the criteria are represented by sampling criteria 116. For instance, the sampling component 114 may use at least a first value associated with a mean (e.g., a first criteria) and/or a second value associated with a standard deviation (e.g., a second criteria) to perform the random sampling.

In some examples, the sampling component 114 may use a standard normal distribution, such as where the mean value is 0 and the standard deviation is 1. However, in other examples, the sampling component 114 may use other distributions. For a first example, if the process 100 is being used to generate voices for a specific type of user, such as light voices, then the sampling component 114 may use a first value for the mean and/or a second value for the standard deviation which causes sampling points within the embedding space that are associated with the first type of speaker. For a second example, if the process 100 is again being used to generate voices for a specific type of user, such as adult voices, then the sampling component 114 may use a first value for the mean and/or a second value for the standard deviation which causes sampling points within the embedding space that are associated with the seventh type of speaker. In such examples, one or more users may indicate the type of speaker and/or may set the mean and/or standard deviation values.

Figure 2:
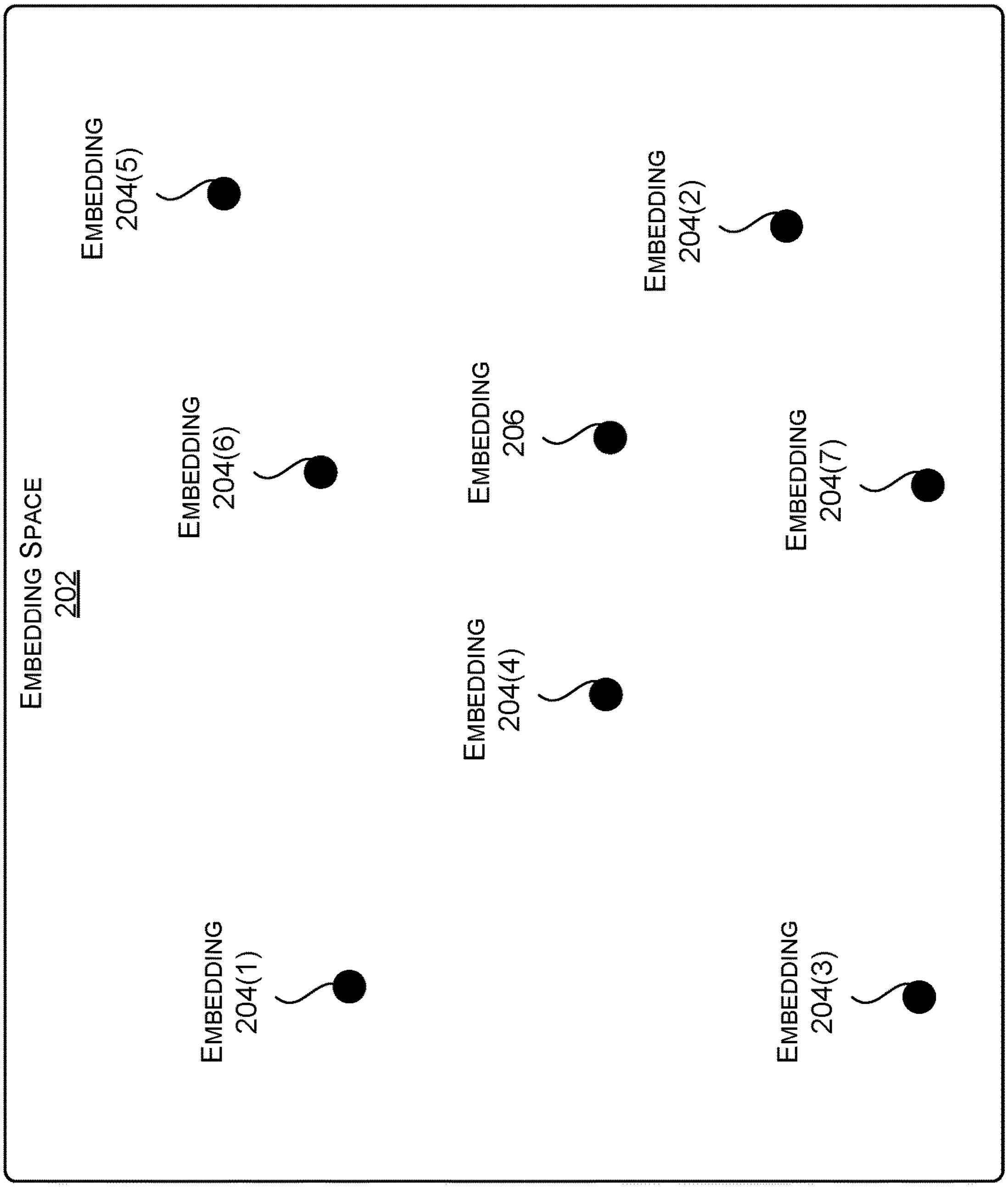
FIG. 2 illustrates an example of sampling an embedding space associated with speaker embeddings, in accordance with some embodiments of the present disclosure.

For instance, FIG. 2 illustrates an example of sampling an embedding space 202 associated with speaker embeddings, in accordance with some embodiments of the present disclosure. While the example of FIG. 2 illustrates the embedding space 202 as only including two dimensions, in other examples, the embedding space 202 may include any dimensionality (e.g., 3 dimensions, 10 dimensions, 100 dimensions, 256 dimensions, etc.). Additionally, as shown, the embedding space 202 may include points associated with speaker embeddings 204(1)-(7) (also referred to singularly as "speaker embedding 204" or in plural as "speaker embeddings 204") generated based at least on actual speech from speakers (e.g., generated using the input speech data 104). The sampling component 114 may then be configured to sample the embedding space 202 in order to identify a point associated with a speaker embedding 206. As such, and as shown, the speaker embedding 206 may differ from each of the other speaker embeddings 204 generated using actual speech. In other words, the speaker embedding 206 may be synthetically produced by the synthetic embedding component 112.

Referring back to the example of FIG. 1, additionally to, or alternatively from, using the sampling component 114, the synthetic embedding component 112 may use an interpolation component 118 to generate speaker embeddings. For instance, to generate a speaker embedding, the interpolation component 118 may identify at least a first speaker embedding represented by the embedding data 106 and a second speaker embedding represented by the embedding data 106. The interpolation component 118 may then generate the speaker embedding using the identified speaker embeddings, such as by the following:

$$v_g = w * v_i + (1 - w) * v_j \tag{1}$$

In equation (1), $v_i$ is the first speaker embedding associated with the first speaker, $v_j$ is the second speaker embedding associated with the second speaker, w is a scalar weight, and $v_g$ is the interpolated speaker embedding. In some examples, the sampling criteria 116 may represent a range for the scalar weight w when sampling the interpolated speaker embedding, such as being 0.1 and 0.9 (although any other range may be used). In some examples, a user may set a value for the scalar weight w. For example, if the user wants the interpolated speaker embedding to correspond to a synthetic voice that is closer to the voice of the first speaker, then the user may set the scalar weight w to be closer to 1. Additionally, if the user wants the interpolated speaker embedding to correspond to a synthetic voice that is closer to the voice of the second speaker, then the user may set the scalar weight w to be closer to 0. Furthermore, if the user wants the interpolated speaker embedding to correspond to a synthetic voice that is between the voice of the first speaker and the voice of the second speaker, then the user may set the scalar weight w to be closer to 0.5.

As shown, the process 100 may include the synthetic embedding component 112 generating and/or outputting embedding data 120 representing one or more synthetic speaker embeddings. In some examples, such as when the process 100 is used to generate a threshold number of synthetic voices, the synthetic embedding component 112 may generate and/or output the embedding data 120 to represent at least the threshold number of speaker embeddings.

As further shown by the example of FIG. 1, the process 100 may include using a synthetic frequency component 122 that is configured to generate random frequency values associated with the synthetic voices. For instance, the synthetic frequency component 122 may use a sampling component 124 that is configured to randomly sample the distribution of frequency values, which is again represented by the frequency data 110, in order to identify frequency values within the distribution. The sampling component 124 may then use the identified frequency values for the synthetic voices. In some examples, the sampling component 124 may use one or more criteria for performing the random sampling, where the criteria are represented by sampling criteria 126. For instance, the sampling component 124 may use at least a first value associated with a mean (e.g., a first criteria) and/or a second value associated with a standard deviation (e.g., a second criteria) to perform the random sampling.

In some examples, the sampling component 124 may use a set distribution associated with one or more (e.g., all) speaker voices in a set, such as where the mean value is 160 and the standard deviation is 55 (although any other values may be used in other examples). However, in other examples, the sampling component 124 may use other distributions. For a first example, if the process 100 is being used to generate synthetic voices for a specific type of speaker, such as speakers with deep voices, then the sampling component 124 may use a first value for the mean (e.g., 120) and/or a second value for the standard deviation (e.g., 20) which causes sampling points within the distribution of frequency values that are associated with the second type of speaker. This may be because the average frequency value for speakers with deep voices may be between 85 Hz and 180 Hz. For a second example, if the process 100 is again being used to generate synthetic voices for a specific type of speaker, such as children voices, then the sampling component 124 may use a first value for the mean (e.g., 300) and/or a second value for the standard deviation (e.g., 20) which causes sampling points within the distribution of frequency values that are associated with the fifth type of speaker. This is because the average frequency value for children may be around 300 Hz. In such examples, one or more users may indicate the type of speaker and/or set the mean and/or standard deviation values.

Figure 3:
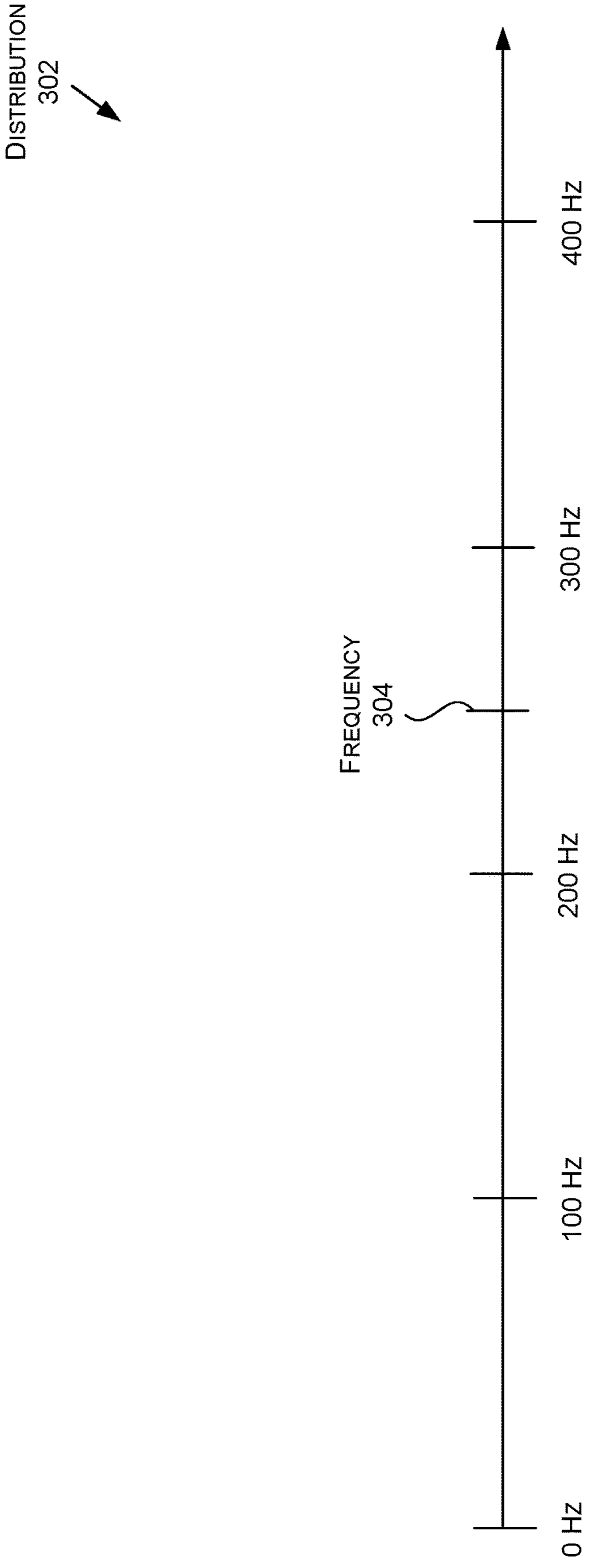
FIG. 3 illustrates an example of sampling a distribution of frequency values associated with voices, in accordance with some embodiments of the present disclosure.

For instance, FIG. 3 illustrates an example of sampling a distribution 302 of frequency values associated with a set of voices, in accordance with some embodiments of the present disclosure. As shown, the distribution 302 may include a range of frequency values that starts at 0 Hz and then continues at least past 400 Hz. As such, the sampling component 124 may then be configured to sample the distribution 302 in order to identify a point associated with a frequency value 304. As described herein, the sampling component 124 may identify the frequency value 304 using at least a mean value and/or a standard deviation value. In other words, the frequency value 304 may be synthetically produced by the synthetic frequency component 122.

Referring back to the example of FIG. 1, the process 100 may include the synthetic frequency component 122 generating and/or outputting frequency data 128 representing one or more synthetic frequency values. In some examples, such as when the process 100 is used to generate a threshold number of synthetic voices, the synthetic frequency component 122 may generate and/or output the frequency data 128 to represent at least the threshold number of frequency values. The process 100 may also include generating synthetic voice data 130 using at least the embedding data 120 and the frequency data 128. For instance, and for a synthetic voice, the synthetic voice data 130 may represent at least a speaker embedding generated by the synthetic embedding component 112 and a frequency value generated by the synthetic frequency component 122. In some examples, the synthetic voice data 130 may represent one or more additional and/or alternative audio voice features, such as an intensity, a phonation, a prosody, a tone, and/or any other voice characteristic.

Figure 4A:
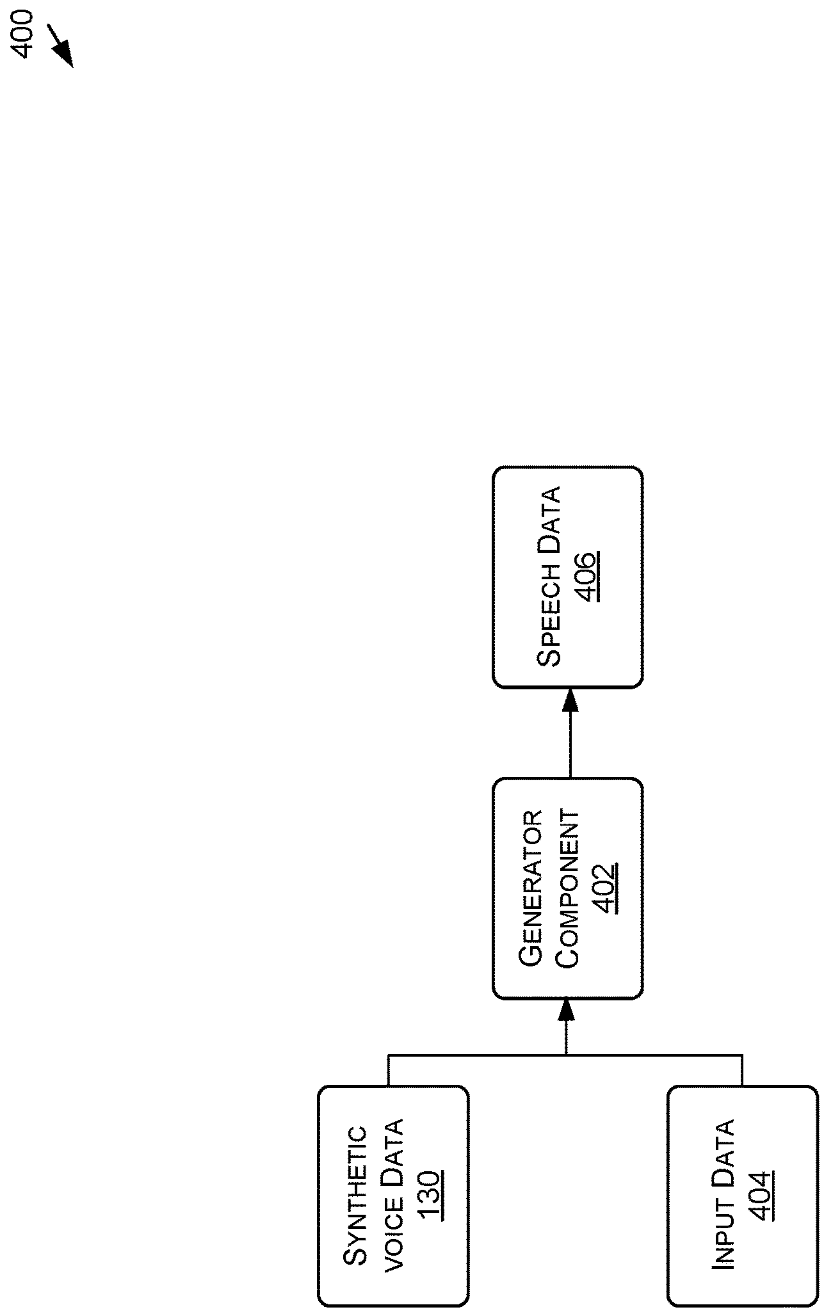
FIGS. 4A-4B illustrate example so processes for generating speech using synthetic voices, in accordance with some embodiments of the present disclosure.

As described herein, the synthetic voice data 130 may then be used to perform one or more tasks. For instance, FIG. 4A illustrates an example of a process 400 for generating speech using synthetic voices, in accordance with some embodiments of the present disclosure. As shown, the process 400 may include a generator component 402 receiving at least a portion of the synthetic voice data 130 (e.g., the generated embedding data 120 and/or the generated frequency data 128) and input data 404. In some examples, the input data 404 may include text data representing text (e.g., linguistic content), such as one or more letters, numbers, words, characters, syllables, phonemes, and/or any other type of text. In some examples, the input data 404 may include audio data representing speech from another speaker, where the speech is also associated with linguistic content. In such examples, the generator component 402 may preprocess the audio data in order to identify the linguistic content.

For instance, the generator component 402 may include a spectrogram generator that generates a spectrogram, where a spectrogram includes a frequency domain representation of the speech, for example using a Fourier transform. In some examples, the spectrogram generator generates a Mel-spectrogram. The linguistic content from the speech may then be represented by phonetic posteriorgram. As such, the generator component 402 may include a phonetic posteriorgram (PPG) encoder that receives a spectrogram and generates PPGs, where the PPGs represent linguistic information in speech. For example, the PPGs may be formatted as likelihoods that a set of possible phonemes are present at a given point in speech, and can disentangle linguistic information from timbre and prosody.

In other examples, the generator component 402 may use any other type of machine learning model, neural network, module, component, and/or the like to identify the linguistic content from the speech. For example, the generator component 402 may use one or more Hidden Markov Models (HMMs), one or more natural language processing (NLP) models, one or more automatic speech recognition (ASR) models, and/or the like to determine the linguistic content from the speech.

The generator component 402 may then process the synthetic voice data 130 and/or the input data 404 and, based at least on the processing, generate speech data 406. As described herein, the speech data 406 may represent the linguistic content associated with the input data 404 spoken using a synthetic voice that is associated the speaker embedding and/or the frequency value represented by the synthetic voice data 130. In some examples, the generator component 402 may use one or more machine learning models, one or more neural networks, one or more modules, and/or any other component to generate the speech data 406.

Figure 4B:
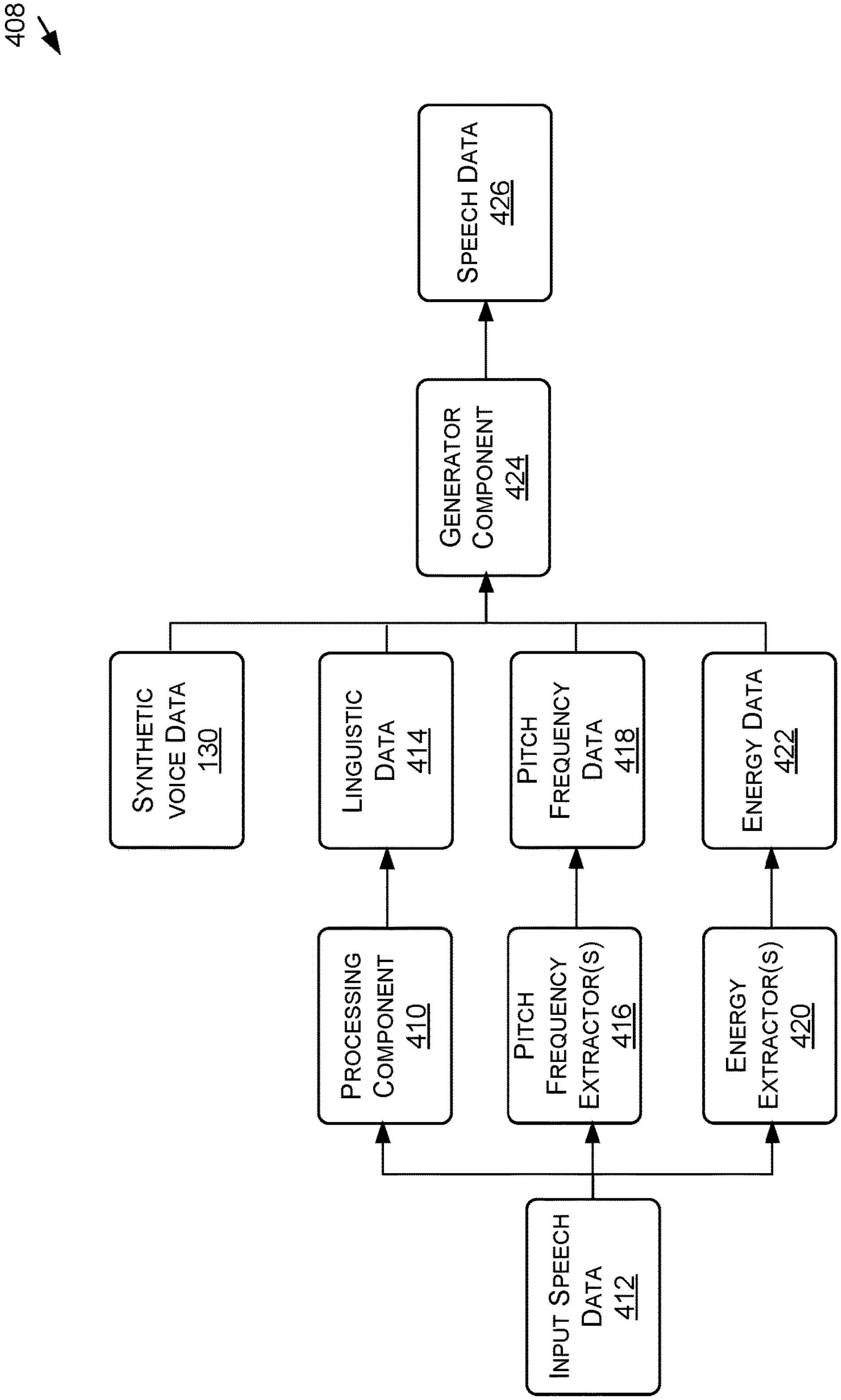

FIG. 4B illustrates another example of a process 408 for generating speech using synthetic voices, in accordance with some embodiments of the present disclosure. As shown, the process 408 may include a processing component 410 receiving input speech data 412. In the example of FIG. 4B, the input speech data 412 may represent speech corresponding to linguistic content in a voice of a speaker. The processing component 410 may then process the input speech data 412 and, based at least on the processing, generate linguistic data 414 representing the linguistic content. For instance, the processing component 410 may include a spectrogram generator that generates a spectrogram, where a spectrogram includes a frequency domain representation of the speech, for example using a Fourier transform. In some examples, the spectrogram generator generates a Mel-spectrogram. The linguistic content from the speech may then be represented by phonetic posteriorgram. As such, the processing component 410 may include a phonetic posteriorgram (PPG) encoder that receives a spectrogram and generates PPGs, where the PPGs represent linguistic information in speech. For example, the PPGs may be formatted as likelihoods that a set of possible phonemes are present at a given point in speech, and can disentangle linguistic information from timbre and prosody.

In other examples, the processing component 410 may use any other type of machine learning model, neural network, module, component, and/or the like to identify the linguistic content from the speech. For example, the generator component 410 may use one or more HMMs, one or more NLP models, one or more ASR models, and/or the like to generate the linguistic data 414 representing the linguistic content.

The process 408 may also include one or more frequency extractors 416 processing the input speech data 412 and, based at least on the processing, generating frequency data 418 representing one or more frequency values associated with the speech. For instance, the frequency extractor(s) 416 may be configured to extract the fundamental frequencies, which may represent the pitch and/or prosody associated with the speech, where the fundamental frequency value(s) is represented by the frequency data 418. The process 408 may also include one or more energy extractors 420 processing the input speech data 412 and, based at least on the processing, generating energy data 422 representing one or more energy values associated with the speech data.

The process 408 may then include a generator component 424 receiving at least a portion of the synthetic voice data 130 (e.g., the generated embedding data 120 and/or the generated frequency data 128), the linguistic data 414, the frequency data 418, and/or the energy data 422. The generator component 424 may then process the synthetic voice data 130, the linguistic data 414, the frequency data 418, and/or the energy data 422 and, based at least on the processing, generate speech data 426. As described herein, the speech data 426 may represent the linguistic content associated with the input speech data 412 spoken using a synthetic voice that is associated the speaker embedding and/or the frequency value represented by the synthetic voice data 130. In some examples, the generator component 424 may use one or more machine learning models, one or more neural networks, one or more modules, and/or any other component to generate the speech data 426.

Figure 5:
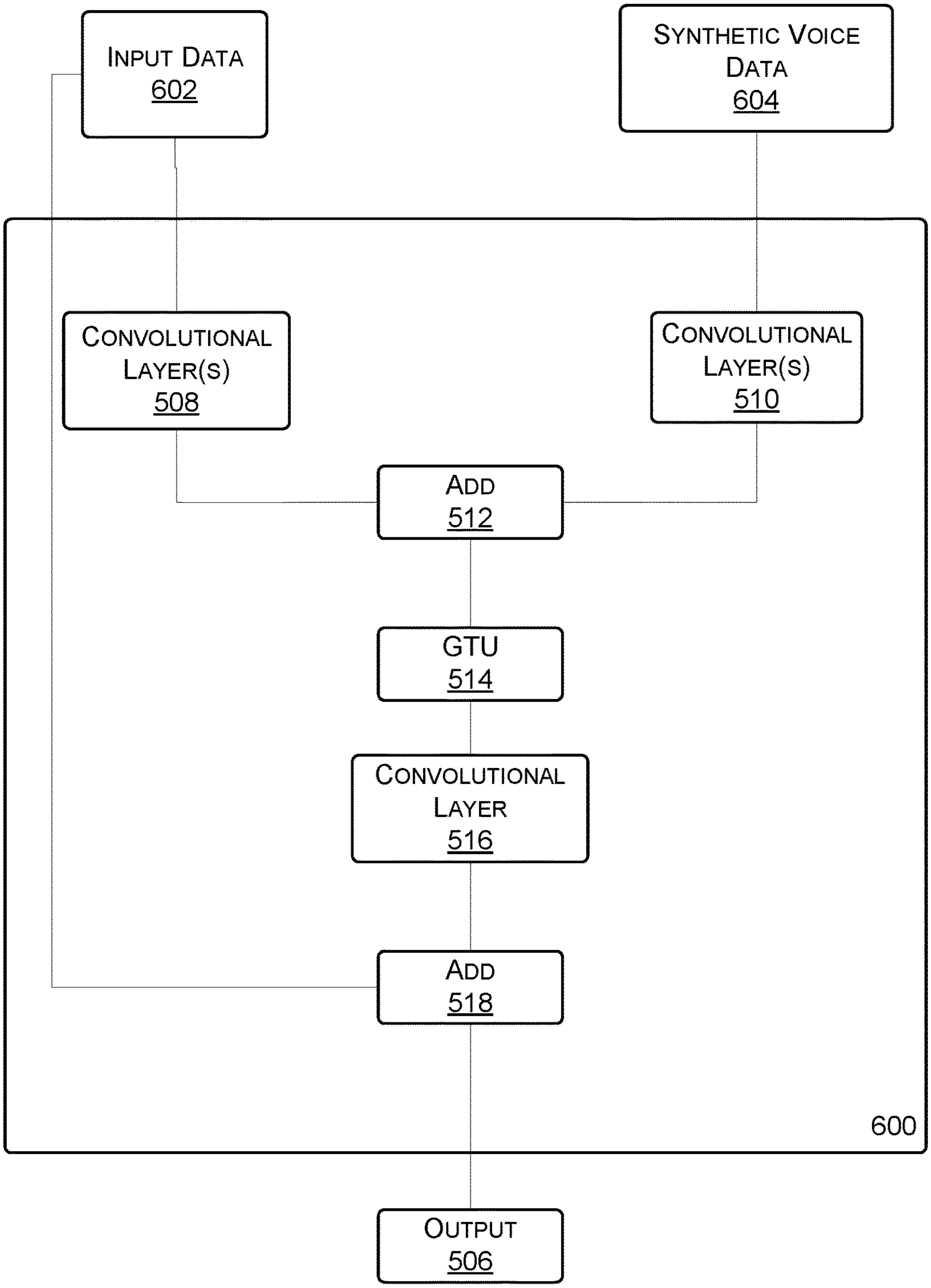
FIG. 5 illustrates an example of at least a portion of a generator that is configured to generate speech using synthetic voices, in accordance with some embodiments of the present disclosure.

For instance, FIG. 5 illustrates an example of at least a portion of a generator (e.g., the generator component 402 and/or the generator component 424) that is configured to generate speech using synthetic voices, in accordance with some embodiments of the present disclosure. For instance, FIG. 5 may represent a residual block 500 associated with the generator component 402 and/or the generator component 424. In some examples, the generator component 402 may include any number of these residual blocks (e.g., one residual block, five residual blocks, fifty residual blocks, etc.).

As shown, the residual block 500 may receive input data 502 (which may represent, and/or include, the input data 404 and/or the input speech data 412) and synthetic voice data 504 (which may represent, and/or include, the synthetic voice data 130). In some examples, the input data 502 may include text data, audio data, and/or any other type of data. In some examples, the input data 502 may include an output 506 from a different residual block 500. In some examples, the synthetic voice data 504 may include a speaker embedding, a frequency value, and/or any other synthetic voice characteristic information.

As shown, the input data 502 may be input to one or more convolutional layers 508. In some examples, the convolutional layer(s) 508 may include a 1-dimensional convolutional layer. Additionally, the synthetic voice data 504 may be input to one or more convolutional layers 510. In some examples, the convolutional layer(s) 510 may include a 1-dimensional convolutional layer. The outputs from convolution layer(s) 508 and the convolution layer(s) 510 may then be added at block 512. Additionally, an output from the block 512 may be input to a gated tanh unit (GTU) 514, an output of which is output to one or more convolutional layers 516. In some examples, the convolutional layer(s) 516 may include a 1-dimensional convolutional layer. In some examples, an output from the convolutional layer(s) 516 is added to the input data 502 at block 518, and this sum is provided as the output 506. In some examples, the output 506 may include, and/or be similar to, the speech data 406 and/or the speech data 426.

Figure 6:
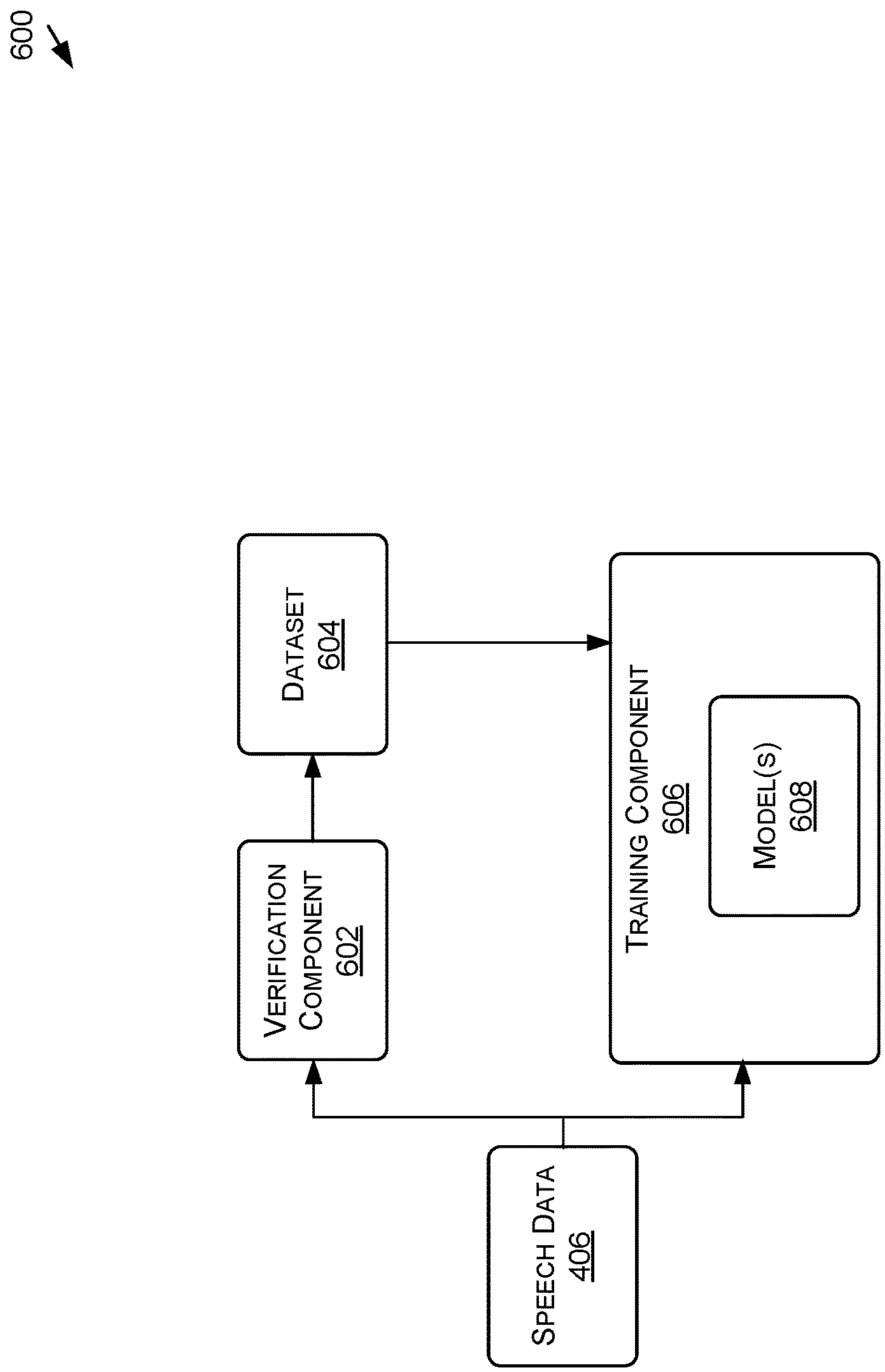
FIG. 6 illustrates an example of a process for using synthetically produced speech to perform one or more tasks, in accordance with some embodiments of the present disclosure.

As described herein, in some examples, the synthetically produced speech may then be used to perform one or more tasks. For instance, FIG. 6 illustrates an example of a process 600 for using synthetically produced speech to perform one or more tasks, in accordance with some embodiments of the present disclosure. As shown, a first task may be associated with a verification component 602 processing the speech data 406 (and/or the speech data 426) and, based at least on the processing, verifying whether the speech includes unique and/or includes an adequate number of unique voices for a multi-speaker dataset 604 (e.g., a large scale multi-speaker dataset). For instance, the verification component 602 may use one or more techniques, such as speaker recognition, voice recognition, speaker authentication, speaker diarization, frequency estimation, matrix representation, Gaussian mixture models, pattern matching algorithms, neural networks, vector quantization, and/or the like to perform the verification.

For an example of performing the verification, the verification component 602 may use one or more speaker encoders to process the speech data 406 and, based at least on the processing, generate embedding data representing speaker embeddings. For example, the speaker encoder(s) may generate a first speaker embedding associated with a first instance of speech corresponding to a first voice, a second speaker embedding associated with a second instance of speech corresponding to a second voice, a third speaker embedding associated with a third instance of speech corresponding to a third voice, and/or so forth. As described herein, the voices corresponding to the speaker embeddings may include actual voices from human speakers or synthetically produced voices that were generated using one or more of the processes described herein. The verification component 602 may then use one or more techniques to compare the speaker embeddings in order to verify that speech corresponds to different voices (e.g., either real or synthetically produced voices) and/or verify that the speech represents a threshold number of different voices.

For example, if the verification component 602 is configured to determine whether the speech data 406 represents a threshold number of unique voices (e.g., five hundred unique voices) for generating the dataset 604, then the verification component 602 may process the speaker embeddings to determine a number of unique voices associated with instances of the speech. The verification component 602 may then verify the speech data 406 for the dataset 604 when the number of unique voices satisfies (e.g., is equal to or greater than) the threshold number unique voices or determine that additional speech samples associated with additional unique voices is needed when the number of unique voices does not satisfy (e.g., is less than) the threshold number unique voices. Additionally, when determining that the number of unique voices does not satisfy the threshold number of unique voices, the verification component 602 may cause the process 100 and/or the process 400 to again occur in order to generate additional speech data representing additional speech samples.

As further shown by the example of FIG. 6, a second task may be associated with a training component 606 training one or more models 608 using the speech data 406 and/or the dataset 604. For instance, the model(s) 608 may be associated with performing one or more tasks associated with speech processing, such as text-to-speech (TTS) processing, ASR, NLP, speaker identification, speaker authentication, voice recognition, and/or any other task. As such, by performing one or more of the processes described herein, the multi-speaker dataset 604 may be generated that includes an adequate number of speech examples corresponding to different voices with using no and/or few speech examples from actual human speakers. This multi-speaker dataset 604 may then be used to train the model(s) 608 to perform one or more of the tasks described herein.

Figure 7:
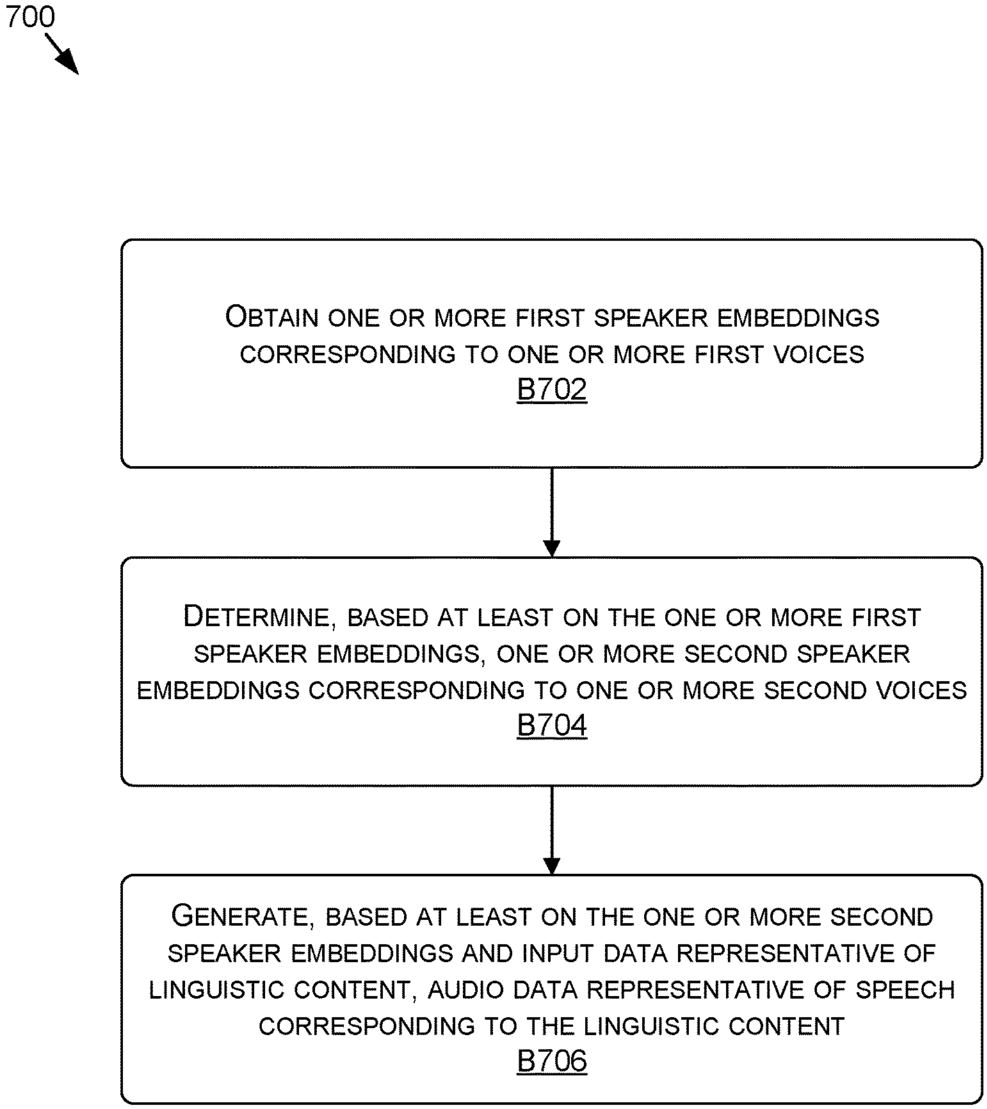
FIG. 7 illustrates a flow diagram showing a method for using speaker embeddings to generate speech corresponding to one or more synthetic voices, in accordance with some embodiments of the present disclosure.
Figure 8:
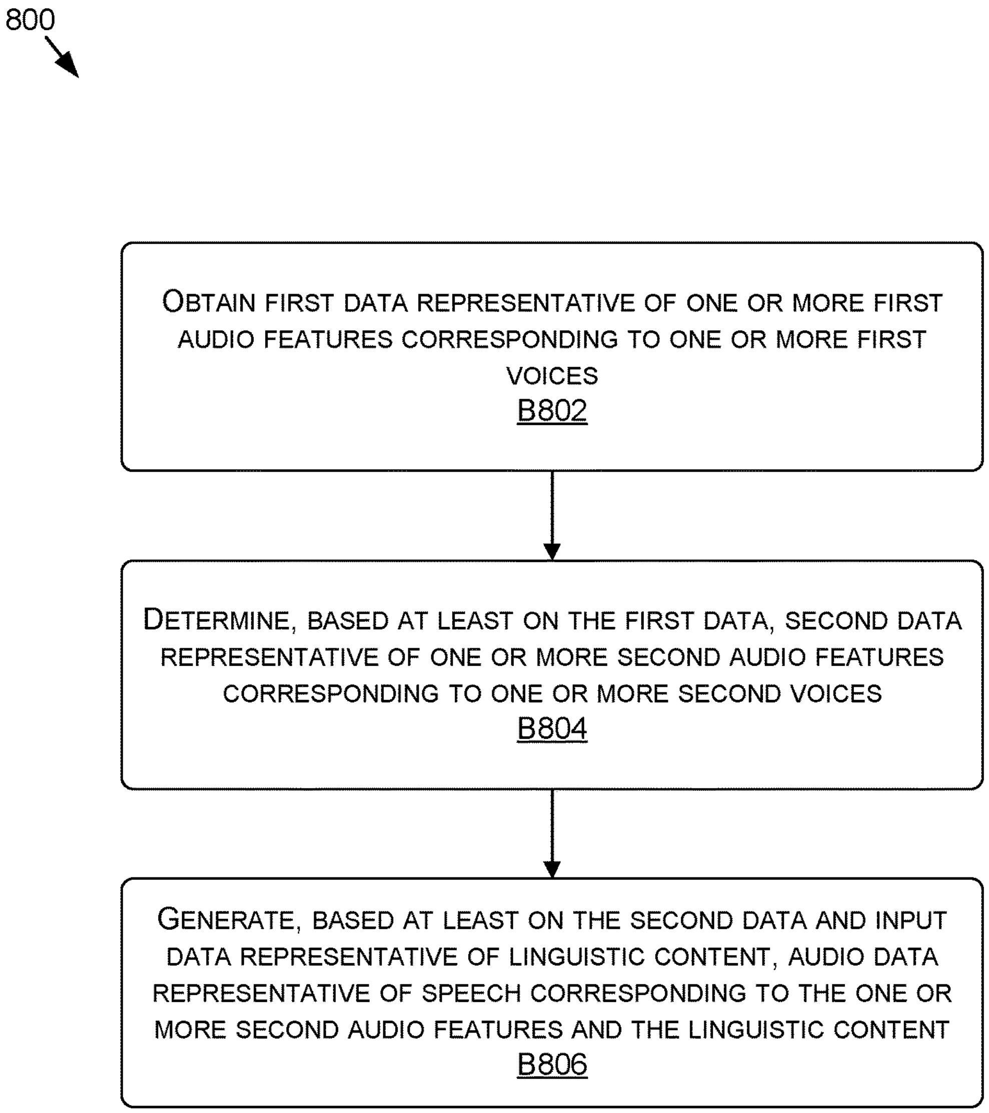
FIG. 8 illustrates a flow diagram showing a method for using audio features to generate speech corresponding to one or more synthetic voices, in accordance with some embodiments of the present disclosure.
Figure 9:
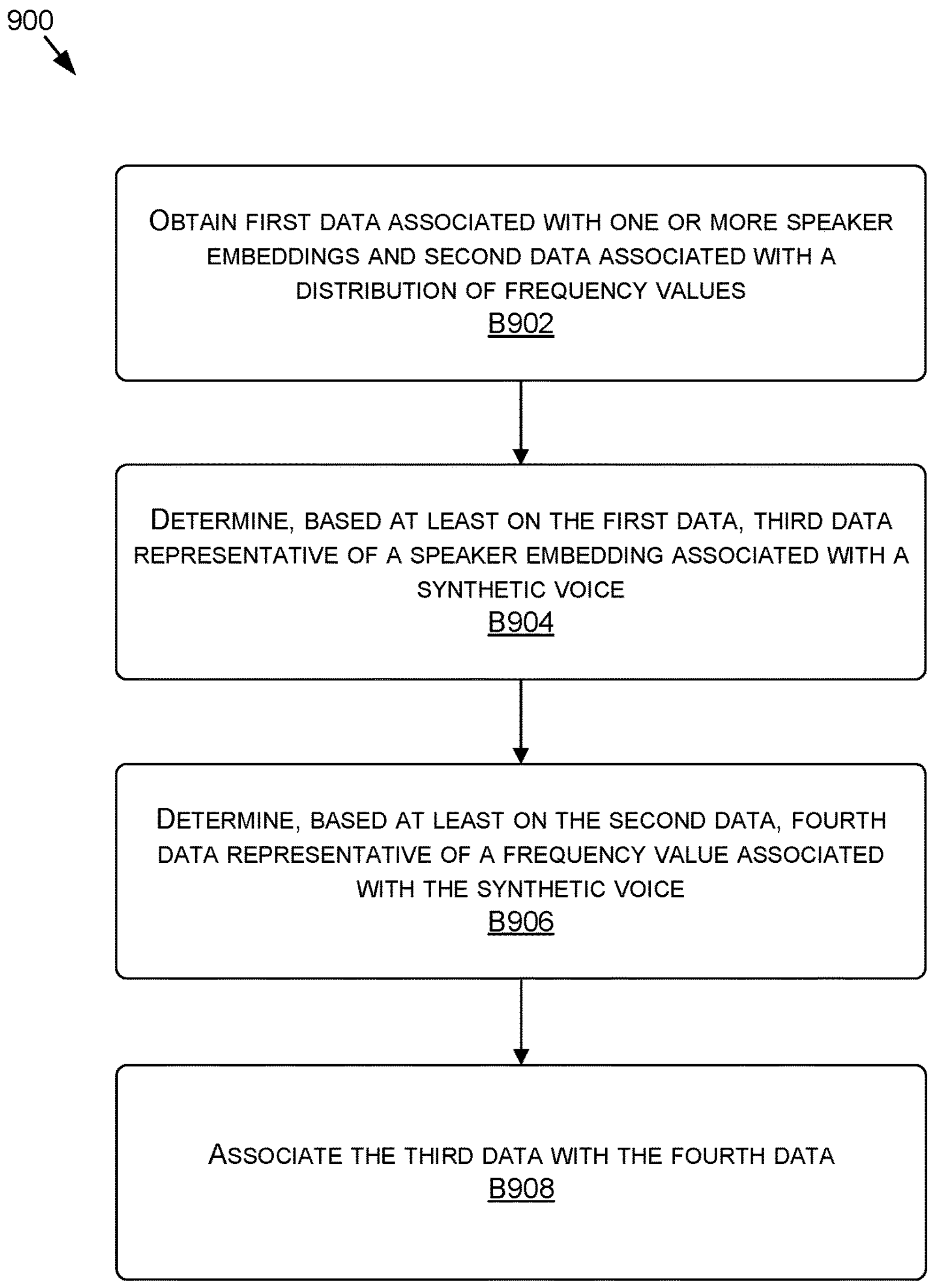
FIG. 9 illustrates a flow diagram showing a method for producing a synthetic voice, in accordance with some embodiments of the present disclosure.

Now referring to FIGS. 7-9, each block of methods 700, 800, and 900, described herein, comprises a computing process that may be performed using any combination of hardware, firmware, and/or software. For instance, various functions may be carried out by a processor executing instructions stored in memory. The methods 700, 800, and 900 may also be embodied as computer-usable instructions stored on computer storage media. The methods 700, 800, and 900 may be provided by a standalone application, a service or hosted service (standalone or in combination with another hosted service), or a plug-in to another product, to name a few. In addition, the methods 700, 800, and 900 are described, by way of example, with respect to FIGS. 1 and 4. However, these methods 700, 800, and 900 may additionally or alternatively be executed by any one system, or any combination of systems, including, but not limited to, those described herein.

FIG. 7 illustrates a flow diagram showing a method 700 for using speaker embeddings to generate speech corresponding to one or more synthetic voices, in accordance with some embodiments of the present disclosure. The method 700, at block B702, may include obtaining one or more first speaker embeddings corresponding to one or more first voices. For instance, the synthetic embedding component 112 may obtain data (e.g., the embedding data 106) generated using the input speech from one or more speakers. As described herein, in some examples, the data may represent the first speaker embedding(s) corresponding to the first voice(s). In some examples, the data may represent an embedding space associated with the first speaker embedding(s). Additionally, in some examples, one or more of the first speaker embedding(s) may be associated with a respective label, such as a label that indicates one or more types of speaker.

The method 700, at block B704, may include determining, based at least on the one or more first speaker embeddings, one or more second speaker embeddings corresponding to one or more second voices. For instance, the synthetic embedding component 112 may process the first speaker embedding(s) and/or the embedding space and, based at least on the processing, generate data (e.g., the embedding data 120) representing the second speaker embedding(s) corresponding to the second voice(s) (e.g., the synthetic voice(s)). As described herein, in some examples, the synthetic embedding component 112 (e.g., the sampling component 114) may generate the second speaker embedding(s) by randomly sampling one or more points within the embedding space. In some examples, the synthetic embedding component 112 (e.g., the interpolation component 118) may generate the second speaker embedding(s) by interpolating between the first speaker embeddings. In any example, the synthetic embedding component 112 may use one or more criteria to generate the second speaker embedding(s), such as when generating voices that include specific types of speakers.

The method 700, at block B706, may include generating, based at least on the one or more second speaker embeddings and input data representative of linguistic content, audio data representative of speech corresponding to the linguistic content. For instance, the generator component 402 may use the second embedding(s) and the input data (e.g., the input data 404) to generate the audio data (e.g., the speech data 406) representing the speech. As described herein, the speech may correspond to the linguistic content and be in the second voice(s). In some examples, the generator component 402 may use additional data when generating the audio data, such as one or more frequency values associated with the second voice(s). Additionally, in some examples, the generator component 402 may use data representing one or more intensity values, one or more phonations, one or more rates, one or more tones, and/or any other voice characteristic.

FIG. 8 illustrates a flow diagram showing a method 800 for using audio features to generate speech corresponding to one or more synthetic voices, in accordance with some embodiments of the present disclosure. The method 800, at block B802, may include obtaining first data representative of one or more first audio features corresponding to one or more first voices. For instance, the synthetic embedding component 112 may obtain the first data (e.g., the embedding data 106) and/or the synthetic frequency component 122 may receive the first data (e.g., the frequency data 110) generated using the input speech from one or more speakers. As described herein, in some examples, the first data may represent one or more speaker embeddings, an embedding space associated with the speaker embedding(s), and/or a distribution of frequency values.

The method 800, at block B804, may include generating, based at least on the first data, second data representative of one or more second audio features corresponding to one or more second voices. For instance, in some examples, the synthetic embedding component 112 may process the first data and, based at least on the processing, generate the second data (e.g., the generated embedding data 120) representing the speaker embedding(s) corresponding to the second voice(s) (e.g., the synthetic voice(s)). Additionally, or alternatively, in some examples, the synthetic frequency component 122 may process the first data and, based at least on the processing, generate the second data (e.g., the generated frequency data 128) representing the frequency value (s) corresponding to the second voice(s).

The method 800, at block B806, may include generating, based at least on the second data and input data representative of linguistic content, audio data representative of speech corresponding to the one or more second audio features and the linguistic content. For instance, the generator component 402 may use the second data and the input data (e.g., the input data 404) to generate the audio data (e.g., the speech data 406) representing the speech. As described herein, the speech may correspond to the linguistic content and be spoken using the second voice(s). In some examples, the generator component 402 may use additional data when generating the audio data, such as one or more intensity values, one or more phonations, one or more prosodies, one or more tones, and/or any other voice characteristic.

FIG. 9 illustrates a flow diagram showing a method 900 for producing a synthetic voice, in accordance with some embodiments of the present disclosure. The method 900, at block B902, may include obtaining first data associated with one or more speaker embeddings and second data associated with a distribution of frequency values. For instance, the synthetic embedding component 112 may obtain the first data (e.g., the embedding data 106) and the synthetic frequency component 122 may obtain the second data (e.g., the frequency data 110), where the first data and the second data are generated using the input speech from one or more speakers. As described herein, in some examples, the first data may represent the speaker embedding(s) and/or an embedding space associated with the speaker embedding(s). Additionally, in some examples, the second data may represent the distribution of frequency values associated with voices.

The method 900, at block B904, may include generating, based at least on the first data, third data representative of a speaker embedding associated with a synthetic voice. For instance, the synthetic embedding component 112 may process the first data and, based at least on the processing, generate the third data (e.g., the generated embedding data 120) representing the speaker embedding associated with the synthetic voice. As descried herein, in some examples, the synthetic embedding component 112 (e.g., the sampling component 114) may generate the third data by randomly sampling one or more points within the embedding space. In some examples, the synthetic embedding component 112 (e.g., the interpolation component 118) may generate the third data by interpolating between speaker embeddings. In any example, the synthetic embedding component 112 may use one or more criteria to generate the third data, such as when generating voices that are associated with specific types of speakers.

The method 900, at block B906, may include generating, based at least on the second data, fourth data representative of a frequency value associated with the synthetic voice. For instance, the synthetic frequency component 122 may process the second data and, based at least on the processing, generate the fourth data (e.g., the generated frequency data 128) representing the frequency value associated with the synthetic voice. As described herein, in some examples, the synthetic frequency component 122 (e.g., the sampling component 124) may generate the fourth data by randomly sampling one or more points associated with the distribution of frequency values. Additionally, the synthetic frequency component 122 may use one or more criteria to generate the fourth data, such as when generating voices that are associated with specific types of speakers.

The method 900, at block B908, may include associating the third data with the fourth data. For instance, the third data may be associated with the fourth data in order to generate the synthetic voice, where the association may be represented by synthetic voice data. As described herein, one or more processes may then be performed with respect to the synthetic voice.

Example Computing Device

Figure 10:
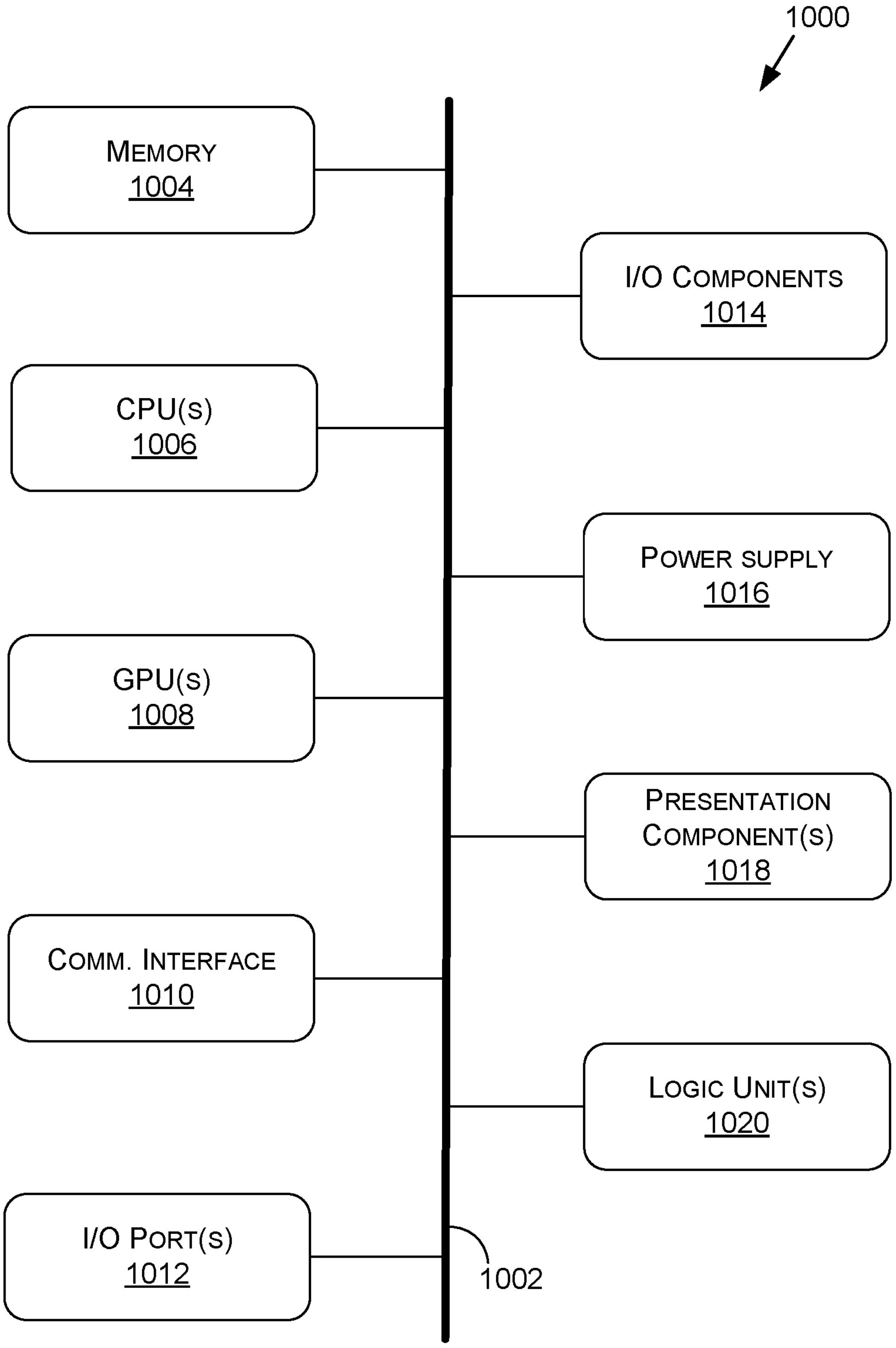
FIG. 10 is a block diagram of an example computing device suitable for use in implementing some embodiments of the present disclosure.

FIG. 10 is a block diagram of an example computing device(s) 1000 suitable for use in implementing some embodiments of the present disclosure. Computing device 1000 may include an interconnect system 1002 that directly or indirectly couples the following devices: memory 1004, one or more central processing units (CPUs) 1006, one or more graphics processing units (GPUs) 1008, a communication interface 1010, input/output (I/O) ports 1012, input/output components 1014, a power supply 1016, one or more presentation components 1018 (e.g., display(s)), and one or more logic units 1020. In at least one embodiment, the computing device(s) 1000 may comprise one or more virtual machines (VMs), and/or any of the components thereof may comprise virtual components (e.g., virtual hardware components). For non-limiting examples, one or more of the GPUs 1008 may comprise one or more vGPUs, one or more of the CPUs 1006 may comprise one or more vCPUs, and/or one or more of the logic units 1020 may comprise one or more virtual logic units. As such, a computing device(s) 1000 may include discrete components (e.g., a full GPU dedicated to the computing device 1000), virtual components (e.g., a portion of a GPU dedicated to the computing device 1000), or a combination thereof.

Although the various blocks of FIG. 10 are shown as connected via the interconnect system 1002 with lines, this is not intended to be limiting and is for clarity only. For example, in some embodiments, a presentation component 1018, such as a display device, may be considered an I/O component 1014 (e.g., if the display is a touch screen). As another example, the CPUs 1006 and/or GPUs 1008 may include memory (e.g., the memory 1004 may be representative of a storage device in addition to the memory of the GPUs 1008, the CPUs 1006, and/or other components). In other words, the computing device of FIG. 10 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 10.

The interconnect system 1002 may represent one or more links or busses, such as an address bus, a data bus, a control bus, or a combination thereof. The interconnect system 1002 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 1006 may be directly connected to the memory 1004. Further, the CPU 1006 may be directly connected to the GPU 1008. Where there is direct, or point-to-point connection between components, the interconnect system 1002 may include a PCIe link to carry out the connection. In these examples, a PCI bus need not be included in the computing device 1000.

The memory 1004 may include any of a variety of computer-readable media. The computer-readable media may be any available media that may be accessed by the computing device 1000. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 1004 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 1000. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 1006 may be configured to execute at least some of the computer-readable instructions to control one or more components of the computing device 1000 to perform one or more of the methods and/or processes described herein. The CPU(s) 1006 may each include one or more cores (e.g., one, two, four, eight, twenty-eight, seventy-two, etc.) that are capable of handling a multitude of software threads simultaneously. The CPU(s) 1006 may include any type of processor, and may include different types of processors depending on the type of computing device 1000 implemented (e.g., processors with fewer cores for mobile devices and processors with more cores for servers). For example, depending on the type of computing device 1000, the processor may be an Advanced RISC Machines (ARM) processor implemented using Reduced Instruction Set Computing (RISC) or an x86 processor implemented using Complex Instruction Set Computing (CISC). The computing device 1000 may include one or more CPUs 1006 in addition to one or more microprocessors or supplementary co-processors, such as math co-processors.

In addition to or alternatively from the CPU(s) 1006, the GPU(s) 1008 may be configured to execute at least some of the computer-readable instructions to control one or more components of the computing device 1000 to perform one or more of the methods and/or processes described herein. One or more of the GPU(s) 1008 may be an integrated GPU (e.g., with one or more of the CPU(s) 1006 and/or one or more of the GPU(s) 1008 may be a discrete GPU. In embodiments, one or more of the GPU(s) 1008 may be a coprocessor of one or more of the CPU(s) 1006. The GPU(s) 1008 may be used by the computing device 1000 to render graphics (e.g., 3D graphics) or perform general purpose computations. For example, the GPU(s) 1008 may be used for General-Purpose computing on GPUs (GPGPU). The GPU(s) 1008 may include hundreds or thousands of cores that are capable of handling hundreds or thousands of software threads simultaneously. The GPU(s) 1008 may generate pixel data for output images in response to rendering commands (e.g., rendering commands from the CPU(s) 1006 received via a host interface). The GPU(s) 1008 may include graphics memory, such as display memory, for storing pixel data or any other suitable data, such as GPGPU data. The display memory may be included as part of the memory 1004. The GPU(s) 1008 may include two or more GPUs operating in parallel (e.g., via a link). The link may directly connect the GPUs (e.g., using NVLINK) or may connect the GPUs through a switch (e.g., using NVSwitch). When combined together, each GPU 1008 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 1006 and/or the GPU(s) 1008, the logic unit(s) 1020 may be configured to execute at least some of the computer-readable instructions to control one or more components of the computing device 1000 to perform one or more of the methods and/or processes described herein. In embodiments, the CPU(s) 1006, the GPU(s) 1008, and/or the logic unit(s) 1020 may discretely or jointly perform any combination of the methods, processes and/or portions thereof. One or more of the logic units 1020 may be part of and/or integrated in one or more of the CPU(s) 1006 and/or the GPU(s) 1008 and/or one or more of the logic units 1020 may be discrete components or otherwise external to the CPU(s) 1006 and/or the GPU(s) 1008. In embodiments, one or more of the logic units 1020 may be a coprocessor of one or more of the CPU(s) 1006 and/or one or more of the GPU(s) 1008.

Examples of the logic unit(s) 1020 include one or more processing cores and/or components thereof, such as Data Processing Units (DPUs), Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 1010 may include one or more receivers, transmitters, and/or transceivers that enable the computing device 1000 to communicate with other computing devices via an electronic communication network, included wired and/or wireless communications. The communication interface 1010 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 1020 and/or communication interface 1010 may include one or more data processing units (DPUs) to transmit data received over a network and/or through interconnect system 1002 directly to (e.g., a memory of) one or more GPU(s) 1008.

The I/O ports 1012 may enable the computing device 1000 to be logically coupled to other devices including the I/O components 1014, the presentation component(s) 1018, and/or other components, some of which may be built in to (e.g., integrated in) the computing device 1000. Illustrative I/O components 1014 include a microphone, mouse, keyboard, joystick, game pad, game controller, satellite dish, scanner, printer, wireless device, etc. The I/O components 1014 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 1000. The computing device 1000 may be include depth cameras, such as stereoscopic camera systems, infrared camera systems, RGB camera systems, touchscreen technology, and combinations of these, for gesture detection and recognition. Additionally, the computing device 1000 may include accelerometers or gyroscopes (e.g., as part of an inertia measurement unit (IMU)) that enable detection of motion. In some examples, the output of the accelerometers or gyroscopes may be used by the computing device 1000 to render immersive augmented reality or virtual reality.

The power supply 1016 may include a hard-wired power supply, a battery power supply, or a combination thereof. The power supply 1016 may provide power to the computing device 1000 to enable the components of the computing device 1000 to operate.

The presentation component(s) 1018 may include a display (e.g., a monitor, a touch screen, a television screen, a heads-up-display (HUD), other display types, or a combination thereof), speakers, and/or other presentation components. The presentation component(s) 1018 may receive data from other components (e.g., the GPU(s) 1008, the CPU(s) 1006, DPUs, etc.), and output the data (e.g., as an image, video, sound, etc.).

Example Data Center

Figure 11:
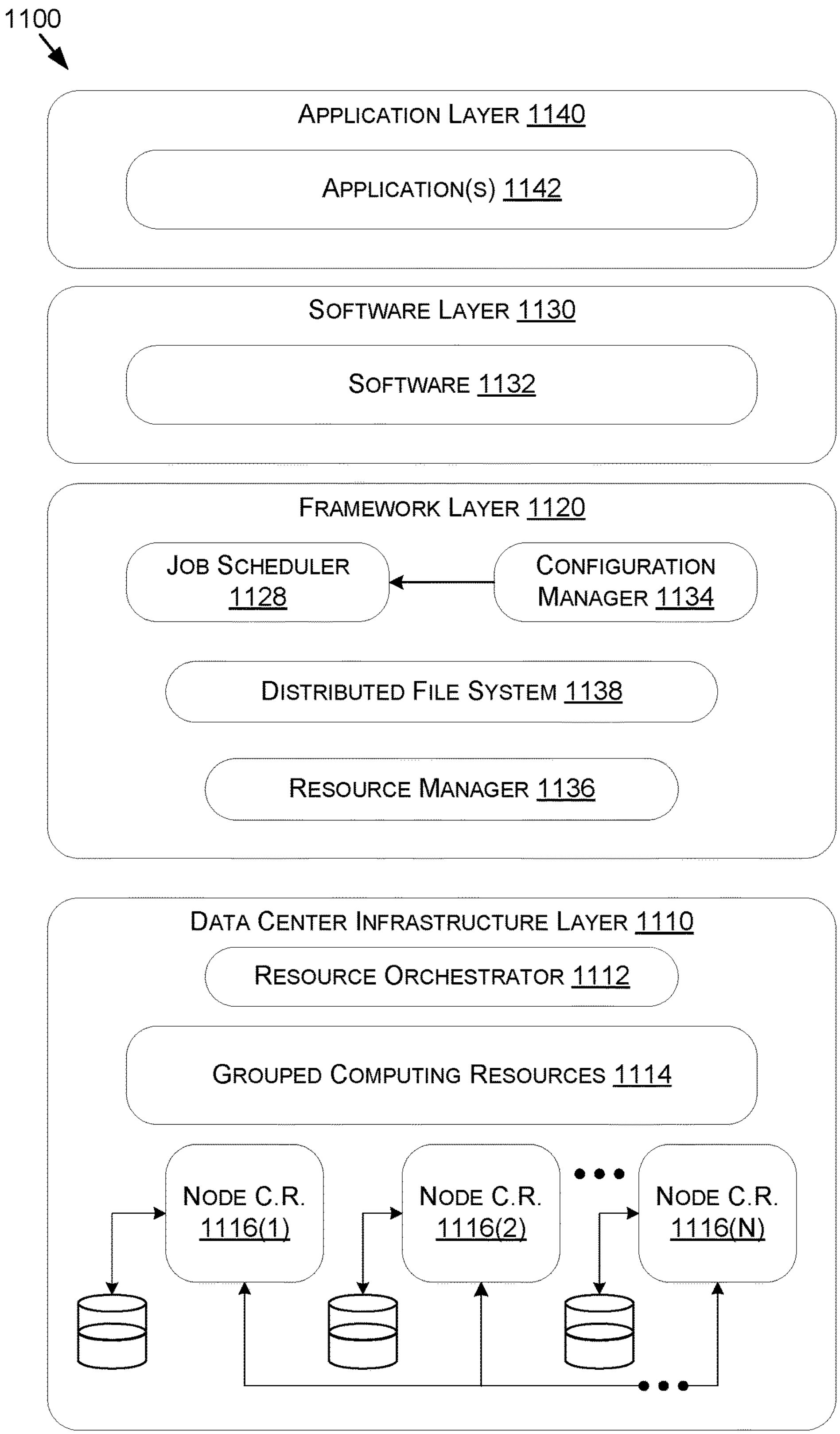
FIG. 11 is a block diagram of an example data center suitable for use in implementing some embodiments of the present disclosure.

FIG. 11 illustrates an example data center 1100 that may be used in at least one embodiments of the present disclosure. The data center 1100 may include a data center infrastructure layer 1110, a framework layer 1120, a software layer 1130, and/or an application layer 1140.

As shown in FIG. 11, the data center infrastructure layer 1110 may include a resource orchestrator 1112, grouped computing resources 1114, and node computing resources ("node C.R.s") 1116(1)-1116(N), where "N" represents any whole, positive integer. In at least one embodiment, node C.R.s 1116(1)-1116(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 1116(1)-1116(N) may correspond to a server having one or more of the above-mentioned computing resources. In addition, in some embodiments, the node C.R.s 1116(1)-11161 (N) may include one or more virtual components, such as vGPUs, vCPUs, and/or the like, and/or one or more of the node C.R.s 1116(1)-1116(N) may correspond to a virtual machine (VM).

In at least one embodiment, grouped computing resources 1114 may include separate groupings of node C.R.s 1116 housed within one or more racks (not shown), or many racks housed in data centers at various geographical locations (also not shown). Separate groupings of node C.R.s 1116 within grouped computing resources 1114 may include grouped compute, network, memory or storage resources that may be configured or allocated to support one or more workloads. In at least one embodiment, several node C.R.s 1116 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 1112 may configure or otherwise control one or more node C.R.s 1116(1)-1116(N) and/or grouped computing resources 1114. In at least one embodiment, resource orchestrator 1112 may include a software design infrastructure (SDI) management entity for the data center 1100. The resource orchestrator 1112 may include hardware, software, or some combination thereof.

In at least one embodiment, as shown in FIG. 11, framework layer 1120 may include a job scheduler 1128, a configuration manager 1134, a resource manager 1136, and/or a distributed file system 1138. The framework layer 1120 may include a framework to support software 1132 of software layer 1130 and/or one or more application(s) 1142 of application layer 1140. The software 1132 or application (s) 1142 may respectively include web-based service software or applications, such as those provided by Amazon Web Services, Google Cloud and Microsoft Azure. The framework layer 1120 may be, but is not limited to, a type of free and open-source software web application framework such as Apache Spark™ (hereinafter "Spark") that may utilize distributed file system 1138 for large-scale data processing (e.g., "big data"). In at least one embodiment, job scheduler 1128 may include a Spark driver to facilitate scheduling of workloads supported by various layers of data center 1100. The configuration manager 1134 may be capable of configuring different layers such as software layer 1130 and framework layer 1120 including Spark and distributed file system 1138 for supporting large-scale data processing. The resource manager 1136 may be capable of managing clustered or grouped computing resources mapped to or allocated for support of distributed file system 1138 and job scheduler 1128. In at least one embodiment, clustered or grouped computing resources may include grouped computing resource 1114 at data center infrastructure layer 1110. The resource manager 1136 may coordinate with resource orchestrator 1112 to manage these mapped or allocated computing resources.

In at least one embodiment, software 1132 included in software layer 1130 may include software used by at least portions of node C.R.s 1116(1)-1116(N), grouped computing resources 1114, and/or distributed file system 1138 of framework layer 1120. One or more types of software may include, but are not limited to, Internet web page search software, e-mail virus scan software, database software, and streaming video content software.

In at least one embodiment, application(s) 1142 included in application layer 1140 may include one or more types of applications used by at least portions of node C.R.s 1116 (1)-1116(N), grouped computing resources 1114, and/or distributed file system 1138 of framework layer 1120. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 1134, resource manager 1136, and resource orchestrator 1112 may implement any number and type of self-modifying actions based on any amount and type of data acquired in any technically feasible fashion. Self-modifying actions may relieve a data center operator of data center 1100 from making possibly bad configuration decisions and possibly avoiding underutilized and/or poor performing portions of a data center.

The data center 1100 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 1100. In at least one embodiment, trained or deployed machine learning models corresponding to one or more neural networks may be used to infer or predict information using resources described above with respect to the data center 1100 by using weight parameters calculated through one or more training techniques, such as but not limited to those described herein.

In at least one embodiment, the data center 1100 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 1000 of FIG. 10—e.g., each device may include similar components, features, and/or functionality of the computing device(s) 1000. In addition, where backend devices (e.g., servers, NAS, etc.) are implemented, the backend devices may be included as part of a data center 1100, an example of which is described in more detail herein with respect to FIG. 11.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 1000 described herein with respect to FIG. 10. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Example Clauses

A: A system comprising: one or more processors to: obtain one or more first speaker embeddings corresponding to one or more speaker voices; determine, based at least on the one or more first speaker embeddings, one or more second speaker embeddings corresponding to one or more synthetic voices; and generate, using the one or more second speaker embeddings and based at least on input data representative of linguistic content, synthetic audio data representative of speech corresponding to the linguistic content.

B: The system of paragraph A, wherein the one or more processors are further to: generate an embedding space based at least on the one or more first speaker embeddings, wherein of the one or more processors are to determine the one or more second speaker embeddings by sampling the embedding space to identify the one or more second speaker embeddings.

C: The system of paragraph A or paragraph B, wherein the one or more processors are further to: obtain one or more third speaker embeddings corresponding to one or more third voices; wherein one or more processors are to determine the one or more second speaker embeddings based at least on interpolating between the one or more first speaker embeddings and the one or more third speaker embeddings.

D: The system of paragraph C, wherein the one or more processors are further to: determine one or more first weights associated with the one or more first speaker embeddings and one or more second weights associated with the one or more second speaker embeddings, wherein the one or more processors are further to determine the one or more second speaker embeddings based at least on the one or more first weights and the one or more second weights.

E: The system of any one of paragraphs A-D, wherein the one or more processors are further to: determine one or more frequency values corresponding to the one or more synthetic voices, wherein the one or more processors are further to determine the one or more second speaker embeddings based at least on the one or more frequency values.

F: The system of paragraph E, wherein the one or more processors are further to: obtain a distribution of frequency values associated with voices, wherein the one or more processors are further to determine the one or more frequency values by sampling the distribution of frequency values to select the one or more frequency values.

G: The system of any one of paragraphs A-F, wherein the system is comprised in at least one of: a control system for an autonomous or semi-autonomous machine; a perception system for an autonomous or semi-autonomous machine; a system for performing one or more simulation operations; a system for performing one or more digital twin operations; a system for performing light transport simulation; a system for performing collaborative content creation for 3D assets; a system for performing one or more deep learning operations; a system implemented using an edge device; a system implemented using a robot; a system for performing one or more generative AI operations; a system for performing operations using a large language model; a system for performing one or more conversational AI operations; a system for generating synthetic data; a system for presenting at least one of virtual reality content, augmented reality content, or mixed reality content; a system incorporating one or more virtual machines (VMs); a system implemented at least partially in a data center; or a system implemented at least partially using cloud computing resources.

H: A method comprising: obtaining first data representative of one or more first audio features corresponding to one or more speaker voices; determining, based at least on the first data, second data representative of one or more second audio features corresponding to one or more synthetic voices; and generate, using the second data and based at least on input data representative of linguistic content, synthetic audio data representative of speech corresponding to the one or more second audio features and the linguistic content.

I: The method of paragraph H, wherein: the first data representative of the one or more first audio features comprises one or more first speaker embeddings corresponding to the one or more speaker voices; and the second data representative of the one or more second audio features comprises one or more second speaker embeddings corresponding to the one or more synthetic voices, the one or more second speaker embeddings being different than the one or more first speaker embeddings.

J: The method of paragraph H or paragraph I, further comprising: generating, based at least on the first data, an embedding space that includes one or more first speaker embeddings corresponding to the one or more first audio features, wherein the determining the second data comprises sampling the embedding space to identify one or more second speaker embeddings corresponding to the one or more second audio features.

K: The method of any one of paragraphs H-J, wherein: the first data representative of the one or more first audio features comprises at least a first speaker embedding corresponding to a first speaker voice of the one or more speaker voices and a second speaker embedding corresponding to a second speaker voice of the one or more speaker voices; and the determining the second data representative of the one or more second audio features comprises determining, based at least on the first speaker embedding and the second speaker embedding, a third speaker embedding corresponding to the one or more synthetic voices.

L: The method of paragraph K, further comprising: determining a first weight associated with the first speaker embedding and a second weight associated with the second speaker embedding, wherein the determining of the third speaker embedding is further based at least on the first weight and the second weight.

M: The method of any one of paragraphs H-L, wherein: the one or more first audio features comprise one or more first frequency values corresponding to the one or more speaker voices; and the one or more second audio features comprise one or more second frequency values corresponding to the one or more synthetic voices.

N: The method of any one of paragraph M, wherein: the first data representative of the one or more first audio features comprises data representative of a distribution of frequency values associated with the one or more speaker voices; and the determining the second data representative of the one or more second audio features comprises sampling the distribution of frequency values to select the one or more second frequency values corresponding to the one or more synthetic voices.

O: The method of any one of paragraphs H-N, further comprising: determining at least one of a first value for a mean associated with a distribution corresponding to the one or more first audio features or a second value for a standard deviation associated with the distribution, wherein the determining the second data is further based at least on the at least one of the first value or the second value.

P: The method of any one of paragraphs H-O, further comprising: determining one or more speaker types associated with the one or more second audio features, wherein the determining the second data is further based at least on the one or more speaker types.

Q: The method of any one of paragraphs H-P, wherein: the one or more first audio features comprise one or more of: one or more first speaker embeddings; one or more first frequency values; one or more first intensity values; one or more first accents; one or more first rates; or one or more first tones; and the one or more second audio features comprise one or more of: one or more second speaker embeddings; one or more second frequency values; one or more second intensity values; one or more second accents; one or more second rates; or one or more second tones.

R: The method of any one of paragraphs H-Q, further comprising: generating, using one or more encoders and based at least on the audio data, one or more speaker embeddings; and storing, based at least on verifying the audio data using the one or more speaker embeddings, the audio data as part of a dataset for training one or more machine learning models.

S: A processor comprising: one or more processing units to generate synthetic audio data using a first speaker embedding and a frequency value associated with a synthetic voice, wherein the first speaker embedding is determined based at least on one or more second speaker embeddings and the frequency value is determined based at least on a distribution of frequency values.

T: The processor of paragraph S, wherein the processor is comprised in at least one of: a control system for an autonomous or semi-autonomous machine; a perception system for an autonomous or semi-autonomous machine; a system for performing one or more simulation operations; a system for performing one or more digital twin operations; a system for performing light transport simulation; a system for performing collaborative content creation for 3D assets; a system for performing one or more deep learning operations; a system implemented using an edge device; a system implemented using a robot; a system for performing one or more generative AI operations; a system for performing operations using a large language model; a system for performing one or more conversational AI operations; a system for generating synthetic data; a system for presenting at least one of virtual reality content, augmented reality content, or mixed reality content; a system incorporating one or more virtual machines (VMs); a system implemented at least partially in a data center; or a system implemented at least partially using cloud computing resources.

What is claimed is:

1. A system comprising:

one or more processors to:

obtain one or more first speaker embeddings corresponding to one or more speaker voices;

determine, based at least on the one or more first speaker embeddings, one or more second speaker embeddings corresponding to one or more synthetic voices;

determine, based at least on sampling a distribution of frequency values associated with voices, one or more frequency values corresponding to the one or more synthetic voices; and generate, using the one or more second speaker embeddings and the one or more frequency values, and based at least on input data representative of linguistic content, synthetic audio data representative of speech corresponding to the linguistic content.

2. The system of claim 1, wherein the one or more processors are further to:

generate an embedding space based at least on the one or more first speaker embeddings, wherein the one or more second speaker embeddings are determined by sampling the embedding space to identify the one or more second speaker embeddings.

3. The system of claim 1, wherein the one or more processors are further to:

obtain one or more third speaker embeddings corresponding to one or more third voices;

wherein the one or more second speaker embeddings are determined based at least on interpolating between the one or more first speaker embeddings and the one or more third speaker embeddings.

4. The system of claim 3, wherein the one or more processors are further to:

determine one or more first weights associated with the one or more first speaker embeddings and one or more second weights associated with the one or more third speaker embeddings, wherein the interpolating uses the one or more first weights and the one or more second weights.

5. The system of claim 1, wherein the one or more processors are further to:

determine at least one of a first value associated with mean or a second value associated with a standard deviation, wherein the sampling the distribution of frequence values is based on the at least one of the first value or the second value.

6. The system of claim 5, wherein the one or more processors are further to:

determine one or more types of users associated with the one or more synthetic voices, wherein the sampling the distribution of frequency values is based at least on the one or more types of users.

7. A method comprising:

obtaining first data representative of a distribution of frequency values corresponding to one or more speaker voices;

determining, based at least on sampling the distribution of frequency values, second data representative of one or more frequency values corresponding to one or more synthetic voices; and generating, using the second data and based at least on input data representative of linguistic content, synthetic audio data representative of speech corresponding to the one or more frequency values and the linguistic content.

8. The method of claim 7, further comprising:

determining one or more first speaker embeddings corresponding to the one or more speaker voices; and determining, based at least on the one or more first speaker embeddings, one or more second speaker embeddings corresponding to the one or more synthetic voices, wherein the generating the synthetic audio data is further based at least on the one or more second speaker embeddings.

9. The method of claim 7, further comprising:

generating an embedding space that includes one or more first speaker embeddings corresponding to the one or more speaker voices; and determining, based at least on sampling the embedding space, one or more second speaker embeddings corresponding to the one or more synthetic voices, wherein the generating the synthetic audio data is further based at least on the one or more second speaker embeddings.

10. The method of claim 7, further comprising:

determining a first speaker embedding corresponding to a first speaker voice of the one or more speaker voices and a second speaker embedding corresponding to a second speaker voice of the one or more speaker voices; and determining, based at least on the first speaker embedding and the second speaker embedding, a third speaker embedding corresponding to the one or more synthetic voices, wherein the generating the synthetic audio data is further based at least on the third speaker embedding.

11. The method of claim 10, further comprising:

determining a first weight associated with the first speaker embedding and a second weight associated with the third speaker embedding, wherein the determining of the third speaker embedding is further based at least on the first weight and the second weight.

12. The method of claim 7, further comprising:

determining at least one of a first value associated with mean or a second value associated with a standard deviation, wherein the sampling the distribution of frequence values is based on the at least one of the first value or the second value.

13. The method of claim 7, further comprising:

determine one or more types of users associated with the one or more synthetic voices, wherein the sampling the distribution of frequency values is based at least on the one or more types of users.

14. The method of claim 7, further comprising:

determining, based at least on one or more speaker types, at least one of a first value associated with a mean or a second value associated with a standard deviation, wherein the sampling the distribution of frequency values is based on the at least one of the first value or the second value.

15. The method of claim 7, further comprising:

determining one or more audio features, the one or more audio features comprising one or more of:

one or more first speaker embeddings;

one or more first intensity values;

one or more first accents;

one or more first rates; or one or more first tones, wherein the generating the synthetic audio data is further based at least on the one or more audio features.

16. The method of claim 7, further comprising:

generating, using one or more encoders and based at least on the synthetic audio data, one or more speaker embeddings; and storing, based at least on verifying the synthetic audio data using the one or more speaker embeddings, the synthetic audio data as part of a dataset for training one or more machine learning models.

17. One or more processors comprising processing circuitry to:

obtain first data representative of a distribution of frequency values corresponding to one or more speaker voices;

determine, based at least on sampling the distribution of frequency values, second data representative of one or more frequency values corresponding to one or more synthetic voices; and generate, using the second data and based at least on input data representative of linguistic content, synthetic audio data representative of speech corresponding to the one or more frequency values and the linguistic content.

18. The one or more processors of claim 17, wherein the processing circuitry is further to:

determine one or more first speaker embeddings corresponding to the one or more speaker voices; and determine, based at least on the one or more first speaker embeddings, one or more second speaker embeddings corresponding to the one or more synthetic voices, wherein the synthetic audio data is further generated based at least on the one or more second speaker embeddings.

19. The one or more processors of claim 17, wherein the processing circuitry is further to:

generate an embedding space that includes one or more first speaker embeddings corresponding to the one or more speaker voices; and determine, based least on sampling the embedding space, one or more second speaker embeddings corresponding to the one or more synthetic voices, wherein the synthetic audio data is further generated based at least on the one or more second speaker embeddings.

20. The one or more processors of claim 17, wherein the processing circuitry is further to: determine at least one of a first value associated with mean or a second value associated with a standard deviation, wherein the sampling the distribution of frequence values is based on the at least one of the first value or the second value.

* * * * *